Nov. 12, 1968  R. E. SELF  3,410,524
CONTROL VALVE
Filed Aug. 1, 1966
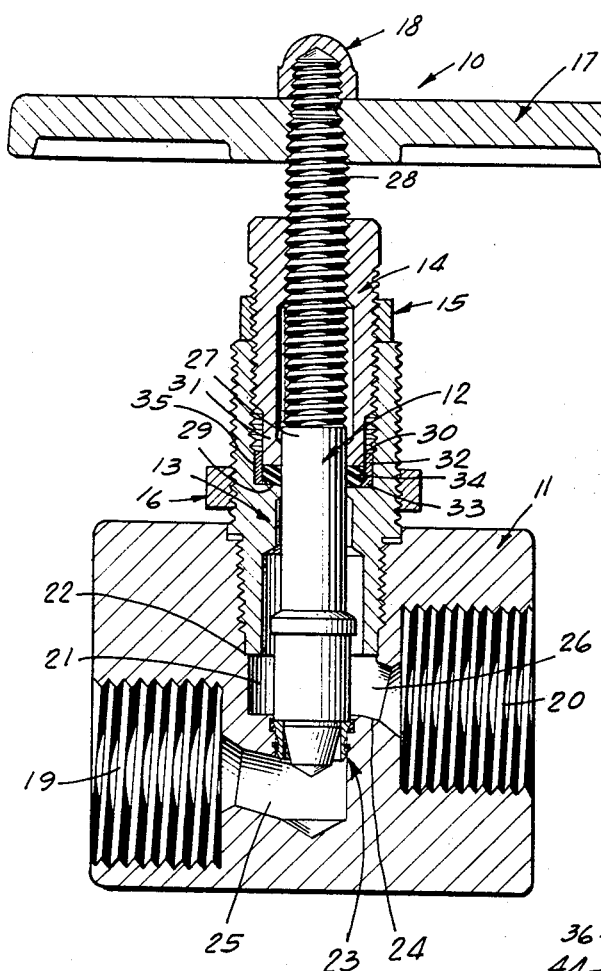
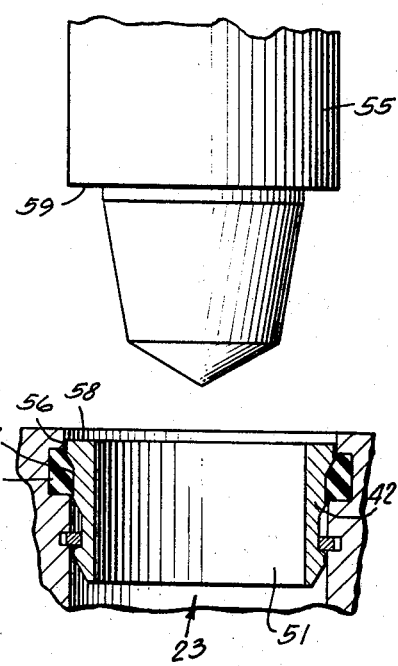
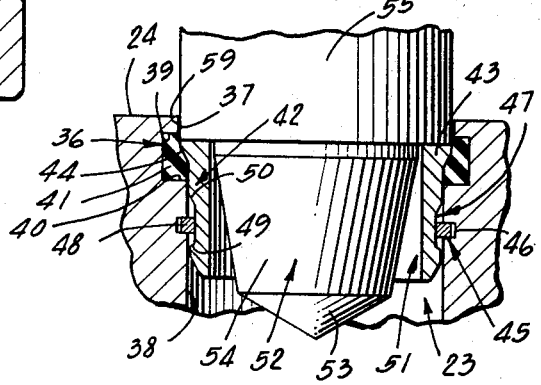
INVENTOR.
RICHARD E. SELF
BY *Hill, Sherman, Meroni, Gross & Simpson* ATTORNEYS United States Patent Office 3,410,524
Patented Nov. 12, 1968

3,410,524
CONTROL VALVE
Richard E. Self, 3221 Brimhall Drive,
Los Alamitos, Calif. 90720
Continuation-in-part of application Ser. No. 324,646,
Nov. 19, 1963. This application Aug. 1, 1966, Ser.
No. 569,133
6 Claims. (Cl. 251—332)

This application is a continuation-in-part of my co-pending application Ser. No. 324,646, filed Nov. 19, 1963, now Patent No. 3,290,002.

This invention relates to a soft seal valve with completely encapsulated seat material protected against erosion in all flow positions of the valve but flowable beyond the capsule to provide an extremely tight seal. Particularly this invention relates to a throttling valve having a spindle sealed by a retractible easily replaced packing which is compressed upon the seating of the spindle to develop a bubble tight seal.

This invention will be specifically described as embodied in a globe type throttling valve which is especially adapted for the handling of high pressure liquids or gases, but it should be understood that the principles of this invention are not limited to any particular valve configuration or end usage. Thus, the packing and encapsulated soft seat features of this invention are generally useful in a wide range of valve designs, and the scope of this invention is therefore not to be limited to the preferred illustrated embodiment.

In the preferred illustrated embodiment of the invention, a valve body is provided with a valve operating chamber between inlet and outlet ports. One of these ports has an annular recess formed at the inside wall thereof, and a sleeve is positioned concentrically in the passage for overlying the recess. The recess is filled with a relatively rigid yet compressible seat material. Polytetrofluoroethylene (Teflon) is an effective soft seat material for the valves of this invention, but other plastics and even metals might be used. The preferred materials have a low coefficient of friction, are compressible, and have a rebound capacity. The seat material filling the recess is completely encapsulated by the wall forming the port and by the sleeve which is disposed concentrically within the port.

The recess has a shoulder which extends inwardly of the port opening, and the sleeve has an outwardly projecting lip which engages the seat material. When the spindle is moved into engagement with the sleeve, the seat material is compressed by the movement of the outwardly projecting lip toward the inwardly extending radial shoulder, thereby allowing the spindle to move into a seated relationship with the compressible seat material.

Thus, the compressed seat material forms an extremely efficient bubble tight seal. The encapsulating sleeve for the soft seat material protects the material against erosion, washout, nibbling or surge from the fluid being handled, and when the seat material is fully compressed there is no flow through the valve. The encapsulating sleeve is rotatably mounted within the port and has no galling effect on the seat material.

It is then an object of this invention to provide a soft seat fluid flow valve with a capsule which fully protects the soft seat material under all operating conditions of the valve.

Another object of this invention is to provide an encapsulated soft seat valve with a fully opened position, a throttling position, a range of metering positions, and a completely closed position where the soft seat material is always fully protected against any effects of erosion, washout, or the like wear caused by the fluid being handled.

A further object of this invention is to provide a port for a spindle valve which has an encapsulated soft seat where the soft seat material is fully protected against the effects of the fluids such as high pressure gases handled by the valve.

Other objects and features of this invention will be apparent to those skilled in this art from the following detailed description of the annexed sheets of drawings which, by way of a preferred example only, illustrate one embodiment of the invention.

On the drawings:

FIGURE 1 is a vertical cross-sectional view of a spindle valve of this invention.

FIGURE 2 is a fragmentary somewhat diagrammatic illustration of the valve in a fully opened position and illustrating the manner in which the soft seat on the spindle is fully encapsulated.

FIGURE 3 is a view similar to FIGURE 2 but illustrating the fully closed position of the valve.

As shown on the drawings:

The valve assembly 10 includes a valve body or housing 11, a spindle 12, a spindle mounting barrel 13 threaded into the housing, a packing nut 14 threaded into the barrel 13, a jam nut 15 threaded on a packing nut 14 and bottomed against the barrel 13 to lock the packing nut and barrel against relative rotation, a panel nut 16 threaded on the barrel adjacent the housing or body 11 for securing the assembly on a panel or the like, and a handle 17 secured on the top of the spindle 12 by an acorn nut 18 threaded on the free end of the spindle.

The valve housing or body 11 has an internally threaded inlet 19 in one end face and a similar internally threaded outlet 20 in the opposite end face. As shown in FIGURE 1, the body 11 has an operating chamber 21 between the inlet 19 and the outlet 20 and opening through the top of the body. The barrel 13 is threaded into this opening and is bottomed on a seat or shoulder 22 of the housing. A cylindrical port 23 surrounded by a flat annular face 24 is provided at the bottom of the operating chamber 21, and a passageway 25 connects the port 23 with the inlet 19. One side of the operating chamber 21 is connected by a passageway 26 to the outlet opening 20. It will of course be understood that flow conditions could be reversed with the port 23 becoming an outlet port.

The spindle has a straight cylindrical portion 27 freely slidable in the barrel 13 and an externally threaded portion 28 threaded in the packing nut 14. The barrel 13 has a radial shoulder 29 under the packing nut 14 forming a packing seat. The nut 14 in turn has cylindrical end face 30 confronting the seat 29.

An effective packing is provided for the spindle portion 27 to prevent leakage along the spindle through the barrel. To this end, the packing nut 14 immediately adjacent the end face 30 has a reduced diameter cylindrical side wall 31 receiving thereon a metal retaining ring 32 with an inturned bottom lip 33. A packing ring 34 of deformable material such as nylon, Teflon, or the like plastic or even a soft deformable metal, is fitted in the retaining ring to rest on the lip 33 thereof. The ring 32 has an internal diameter providing a slip fit on the cylindrical side wall 31, and the ring can be deformed out of round to effect an interference fit to fixedly secure it to the wall 31.

The barrel 13 has a plain cylindrical side wall 35 immediately adjacent the seat 29 and under the threaded portion 36 which receives the threaded packing nut 14, which wall 35 is of sufficiently large diameter to freely receive the retaining ring 32.

The packing ring 34 fits snugly in the retaining ring 32 and has an internal diameter snugly receiving the portion 27 of the spindle 12.

To set the packing assembly in proper sealing relationship between the barrel 13 and the spindle portion 27 it is only necessary to insert the spindle into the barrel, place the packing ring 34 into the retaining ring, assemble the retaining ring on the wall 31 of the packing nut 14, thread the packing nut around the spindle and into the barrel and tighten the packing nut sufficiently in the barrel so that the packing ring 34 will be loaded between the seat 29 and the end face 30.

Since the packing ring 34 is slightly deformable it will accommodate itself to a tight fit between the opposed sealing faces 29 and 30 of the barrel and nut and around the spindle portion 27. To remove the packing for replacement it is only necessary to unthread the packing nut from the barrel whereupon the packing assembly will be retracted with the packing nut as illustrated in FIGURE 4.

In accordance with this invention, the port 23 which is formed between the inlet 19 and the outlet 20 has an annular recess 36 which is spaced axially from the surface 24. The recess 36 is continuous around the port 23 and provides the means for holding a seal ring having the valve seating features of this invention.

The port 23 has a first wall portion 37 formed adjacent to the surface 24 and has an inwardly stepped wall portion 38 formed at the opposite side of the recess 36. Due to the stepped relationship of the walls 37 and 38, the recess 36 has radial shoulders 39 and 40 which have different effective areas, namely the radial shoulder 40 has a larger surface area than the radial shoulder 39.

In accordance with this invention a Teflon seal 41 fills the recess 36 and is confined between the shoulders 39 and 40. The Teflon filling is in the form of a cylindrical sleeve having an outer diameter which is substantially the same as the diameter of the recess 36.

This sleeve or filling 41 constitutes the soft valve seat of this invention.

In accordance with this invention the soft seat 41 is encapsulated by a metal sleeve 42 which is slidably mounted concentrically within the passage 23. The sleeve 42 has an outwardly projecting lip 43 which engages the seal ring 41 as at the point 44. This engagement of the lip 43 with the seal ring 41 restricts the axial movement of the sleeve 42 in a direction away from the surface 24.

Since the sleeve 42 is intended to slide within the passage 23, a lost motion connection 45 is provided between the wall 38 and the outer surface of the sleeve 42. The lost motion connection consists of an annular groove 46 which is formed in the wall 38 and a recess 47 which is formed within the outer surface of the sleeve 42. A snap ring 48 or the like may be fitted within the groove 46 so as to confine the axial movement of the sleeve 42 to the limits 49 and 50 established by the recess 47.

The sleeve 42 has a bore 51 which is provided for receiving a leading end nose 52. The end nose 52 has a relatively flat pointed leading edge 53 followed by a tapered side wall 54 which diverges to a cylindrical side wall or head 55. The end nose 52 fits freely within the sleeve port 51, and the cylindrical side wall 55 fits in relatively closed relationship with the wall 37 associated with the port 23.

The sealing function of the valve structure of this invention can best be understood from a consideration of FIGURES 2 and 3 jointly. When the head 55 is in an opened position as shown in FIGURE 2, the sleeve 42 is in a relaxed position with the seal ring 41. In this position high pressure gas or the like may flow through the port 23 and pass to the outlet 20. During this time, however, the seal ring 41 is protected from erosion due to the presence of the gas by the particular structure of the sleeve 42. Essentially, the sleeve 42 has axially extending surfaces 56 and 57 which are confronting to the surfaces 37 and 38 respectively of the port 23. Due to the close contact of the surface 56 at the surface 37 and of the surface 57 at the surface 38, the ring 41 is constantly protected from the movement of gas which may tend to be destructive of the seal ring 41.

As the leading end nose 52 of the spindle is moved to the port 23, the flow of fluids or gases through the port 23 is progressively reduced as described in my co-pending patent application Ser. No. 324,646. When, however, the valve head 55 contacts the sleeve 42, the seal ring 41 begins to be compressed with the result that a bubble tight seal is effected.

For this purpose, the sleeve 42 has an end face 58, and the valve head 55 has a shoulder 59. As the nose 52 transaltes into the sleeve bore 51, the shoulder 59 moves into engagement with the end face 58.

As the valve head 55 continues to move into the port 23 after contacting the end face 58 with the shoulder 59, the outwardly projecting lip 43 of the sleeve 42 begins to compress the seal ring 41 against the radial shoulder 40. This compression of the seal ring 41 causes a tight seal to be formed against the lip 43 and the adjacent outer cylindrical surface of the sleeve 42. Also, as the head 55 begins to move into a confronting position with the surface 37 of the port 23, a seal is effected about the cylindrical surface 55.

The seal about the cylindrical surface or head 55 is made possible due to the movement of the shoulder 59 below the radial shoulder 39 of the recess 36. The compression of the ring 41 then exerts a sealing force against the cylindrical surface 55 as at 59. To accomplish a tight seal, the cylindrical surface 55 is constructed to have a diameter substantially equal to the diameter of the outwardly projecting lip 43. Therefore, the movement of the lip into the seal ring 41 allows the head or cylindrical wall 55 to follow into its sealing position.

The valve of this invention is constructed to continuously encapsulate the valve seat and thereby protect the sealing material forming the seat from the erosive effects of the fluid moving through the valve. As seen in FIGURE 3, the encapsulating effect is maintained during the closed valve position as well as during the open position as shown in FIGURE 2. All steps in between fully opened and fully closed positions also provide that the seal ring will be completely encapsulated. This encapsulation is provided first, by the confronting walls 56 and 57 of the sleeve 42, and second, by the close relationship of the end face 58 of the sleeve 42 to the shoulder 59 of the head 55.

From the above description it will therefore be understood that this invention provides an improved soft seat flow control valve wherein the sealing material is completely encapsulated against erosion or wear from fluid flow. It will also be understood that various modifications and combinations of the features of this invention may be accomplished by those skilled in the art, but I desire to claim all such modifications and combinations as properly come within the scope and spirit of my contribution to the art.

I claim:

1. A sealing joint having a surface intersected by a passage, said passage having a continuous annular recess formed therein and spaced axially inwardly of said surface, a ring-shaped volume of highly viscous, flowable, compressible material filling all of said recess and in sufficient excess to project outwardly of the recess and radially inwardly of said passage, said recess having axially spaced radial shoulder means overlying said ring shaped volume, one of said shoulder means having an effective area greater than the correspondingly oppositely disposed radial shoulder, a sleeve positioned concentrically in said passage and having an outwardly projecting lip thereof for abutting said ring shaped volume, said outwardly projecting lip and said passage having confronting axially extending concentric surfaces sized to have a sliding fit with one another, whereby said ring-shaped volume is protected against erosion by any fluids flowing through said passage,
said lip thereby restricting the movement of said sleeve in an axial direction away from said surface,
said sleeve having an end face adjacent to said lip and facing outwardly of said passage,
a spindle member having a head portion and being movable axially into and out of said passage,
said head portion having a shoulder forming a piston head movable into said passage and being of a diameter substantially equal to the diameter of said lip,
said piston head engaging said end face of said sleeve after being moved into said passage and progressively forcibly causing said lip to compress said ring-shaped volume within said recess,
said piston head being movable into said passage after said shoulder engages said end face to compress said ring shaped volume,
thereby separating said axially extending confronting surfaces while translating said spindle member into said passage,
the compression of ring-shaped volume building up contact pressure between said outwardly projecting lip and a radial shoulder means of said recess and allowing said piston head to be moved to a concentrically confronting position with said ring-shaped volume.

2. A sealing joint having a surface intersected by a passage,
said passage having a continuous annular recess formed therein and spaced axially inwardly of said surface,
a ring-shaped volume of highly viscous, flowable, compressible material filling all of said recess and in sufficient excess to project outwardly of the recess and radially inwardly of said passage,
a sleeve positioned concentrically in said passage and having an outwardly projecting lip thereof for abutting said ring-shaped volume,
said lip thereby restricting the movement of said sleeve in an axial direction away from said surface,
said sleeve having an end face adjacent to said lip and facing outwardly of said passage,
a spindle member having a head portion and being movable axially into and out of said passage,
said head portion having a shoulder forming a piston head movable into said passage and being of a diameter substantially equal to the diameter of said lip,
said piston head engaging said end face of said sleeve after being moved into said passage and progressively forcibly causing said lip to compress said ring-shaped volume within said recess,
said piston head being movable into said passage after said shoulder engages said end face to compress said ring-shaped volume.

3. A sealing joint as defined in claim 1 wherein said material comprises Teflon.

4. A sealing joint as defined in claim 1 and further characterized by
said spindle member being rotatable,
and screw threaded actuator means for axially moving said spindle member into and out of said passage upon rotation of said actuator means.

5. A sealing joint as defined in claim 4 and further characterized by
said sleeve and said passage having a coupling connection affording limited relative axial movement and free relative rotational movement,
whereby rotational adjustment on said actuator means to control the contact pressure between said end face and said surface will regulate fine and ultrafine metering through the passage.

6. A sealing joint as defined in claim 1 wherein said passage has an inwardly radially stepped portion forming one of the radial shoulder means associated with said recess and wherein said sleeve has a confronting axially extending concentric surface sized to have a sliding fit with said stepped portion of said passage.

References Cited

UNITED STATES PATENTS

| | | | |
|---|---|---|---|
| 2,060,748 | 11/1936 | Roberts et al. | 251—332 |
| 2,348,548 | 5/1944 | Koehler | 251—364 |
| 2,985,424 | 5/1961 | Anderson et al. | 251—332 |
| 3,084,903 | 4/1963 | Parks | 251—210 X |
| 3,145,010 | 8/1964 | Karr | 251—210 |
| 3,327,991 | 6/1967 | Wallace | 251—332 X |

FOREIGN PATENTS

| | | |
|---|---|---|
| 1,287,110 | 1/1962 | France. |
| 835,448 | 3/1952 | Germany. |

M. CARY NELSON, *Primary Examiner.*

R. C. MILLER, *Assistant Examiner.*